CENTER PLATE WEAR LINER RING

Original Filed April 1, 1969 2 Sheets-Sheet 1

Inventor:
Hugh G. Robertson

By: Walter L. Schlegel, Jr.
Lucien W. Fyke
Attys

CENTER PLATE WEAR LINER RING

Original Filed April 1, 1969 2 Sheets-Sheet 2

Inventor:
Hugh G. Robertson
By:
Walter J. Schlegel, Jr.
Lucien A. Fyle
Attys

United States Patent Office

Re. 28,279
Reissued Dec. 24, 1974

28,279

CENTER PLATE WEAR LINER RING

Hugh G. Robertson, Alliance, Ohio, by AMSTED Industries Inc., Chicago, Ill., assignee Original No. 3,599,574, dated Aug. 17, 1971, Ser. No. 811,984, Apr. 1, 1969. Application for reissue May 29, 1973, Ser. No. 364,490
Int. Cl. B61f *5/14, 5/16;* F16c *17/04*
U.S. Cl. 105—199 C 2 Claims

Matter enclosed in heavy brackets [ ] appears in the original patent but forms no part of this reissue specification; matter printed in italics indicates the additions made by reissue.

ABSTRACT OF THE DISCLOSURE

A wear ring is provided in the recess of the truck bolster center plate to protect the vertical annular wall of said recess. The annular wall is inclined outward from top to bottom, and the outer surface of the ring is similarly tapered outward to restrain the ring from vertical movements. The ring has a gap to enable expansion of the ring against the interior wall. The ring is welded to the wall at the gap.

This invention relates to improvements in railway trucks and more particularly to a novel wear lining that is used in the center plate of the bolster of such trucks.

It is common practice for manufacturers of railway bolsters to secure a hardened steel ring within the recess of the center plate of the truck bolster, in order to provide for better wear qualities of the center plate. The ring is usually welded to the inner vertical machined wall of the center plate. Difficulty has been experienced with the cracking of welds and undesirable loosening of the ring.

Accordingly, an object of this invention is to provide a wear ring for a truck bolster center plate that may be easily secured and held in position.

Other objects will appear from the following description and claims, taken in connection with the accompanying drawings, wherein:

Figure 1:
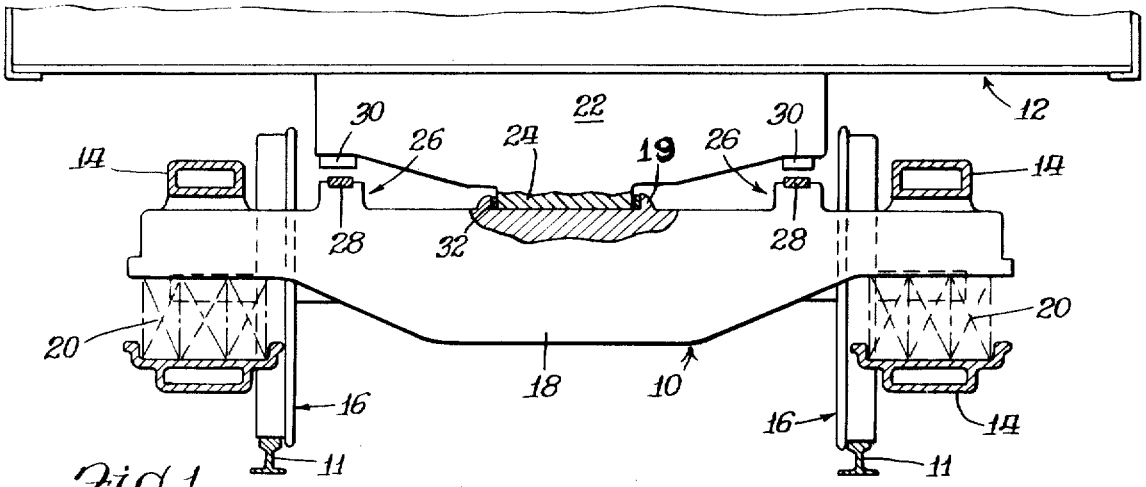
FIG. 1 is an end view, partly in cross section and with certain parts removed, of a railway truck that incorporates the novel wear liner described herein.

With more particular reference to the drawing, FIG. 1 shows a railway car truck 10 supporting a car body 12. The car truck 10 comprises a pair of spaced side frames 14 supported upon wheel and axle assemblies 16, the wheels of which assemblies travel on rails 11. A truck bolster 18 having a center plate 19 extends between side frames 14 and is supported near its ends on spring groups, indicated diagrammatically at 20, within the side frames.

The car body 12 is supported on a car bolster 22 having a center plate 24, which rests on the center plate 19 of the truck bolster 18. Side bearings 26 having pads 28 are mounted adjacent opposite ends of the truck bolster 18 and are engageable with bearings 30 on the car bolster 22.

Figure 2:
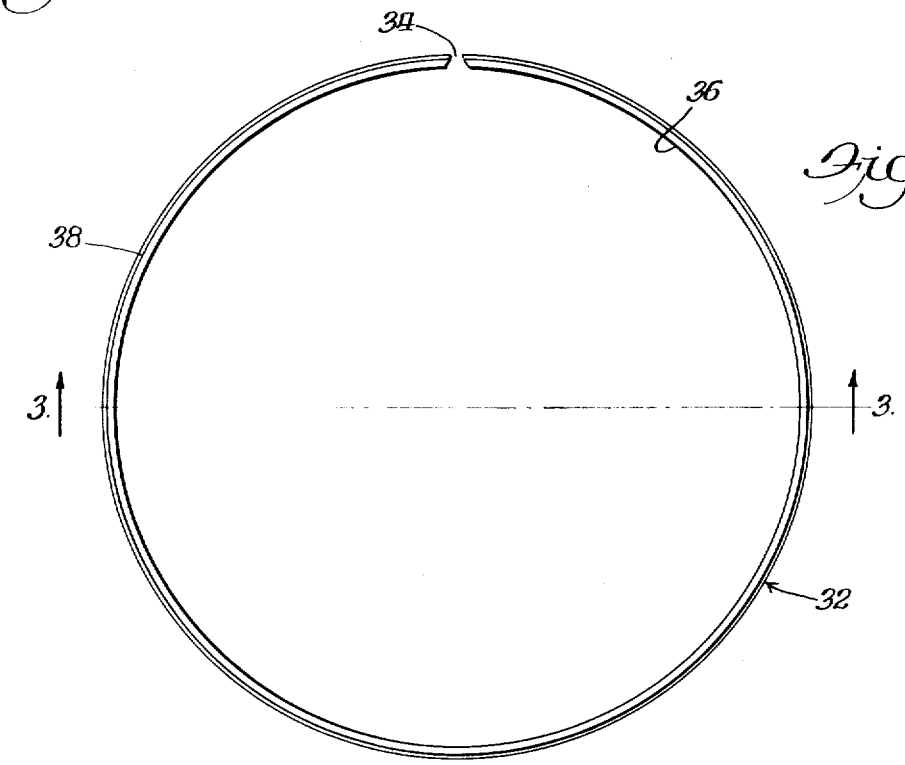
FIG. 2 is a plan view of the wear liner.
Figure 3:
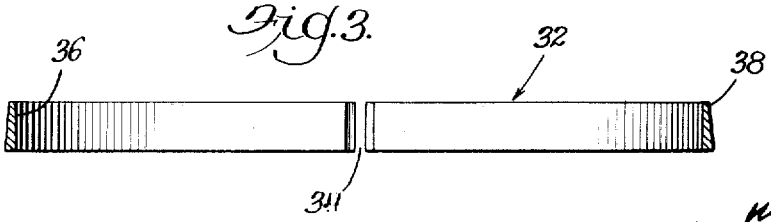
FIG. 3 is a cross-sectional view through section line 3–3 in FIG. 2.

The wear liner 32, as shown in FIG. 1, is located within the truck bolster center plate 19, and may be best understood by reference to FIGS. 2–6. As shown in FIG. 2, the wear liner 32 is in the general form of a split ring that is continuous around its circumference except for a gap 34 therein. When viewed in vertical section, as shown in FIG. 3, it may be seen that the ring has a regular cylindrical inner surface 36 and an outer surface 38 that is tapered outward from the top to the bottom. The ring is preferably formed of a high carbon rolled steel having a manganese content of 11–14 percent and a hardness of 180–245 Brinell.

Figure 4:
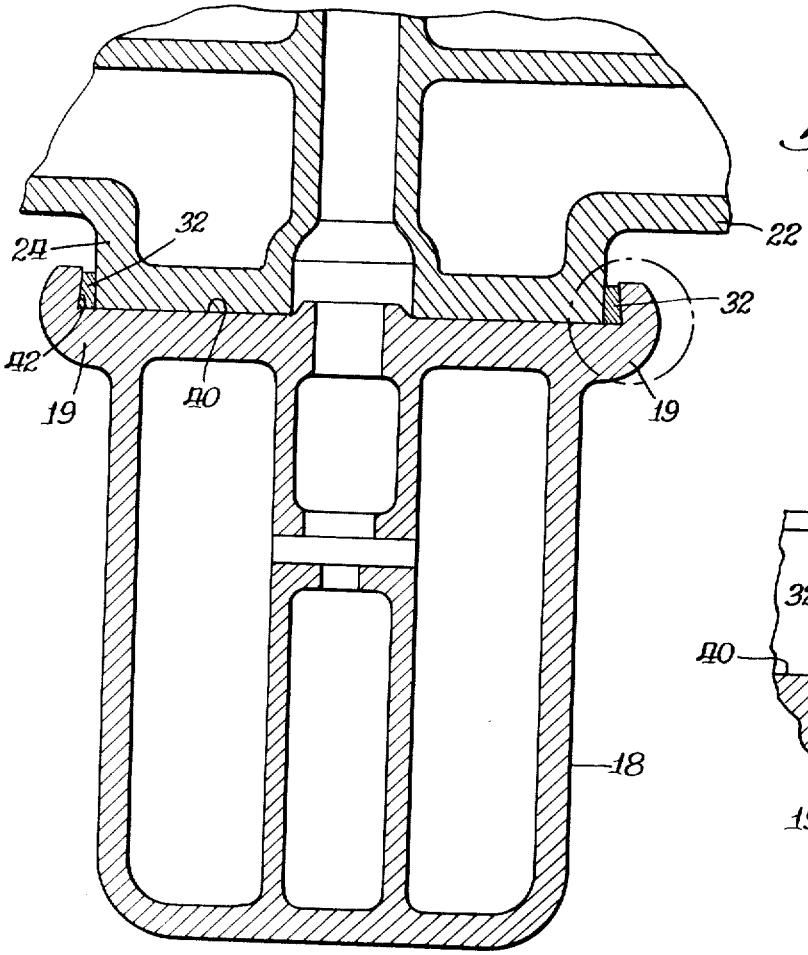
FIG. 4 is a longitudinal vertical sectional view of a portion of the truck of FIG. 1, showing the wear lining in position between the mating center plates of the car and truck.
Figure 5:
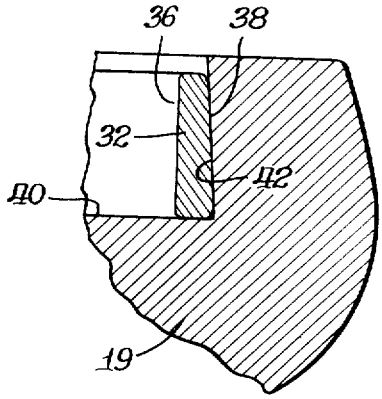
FIG. 5 is a fragmentary sectional view of the detail encircled in FIG. 4.
Figure 6:
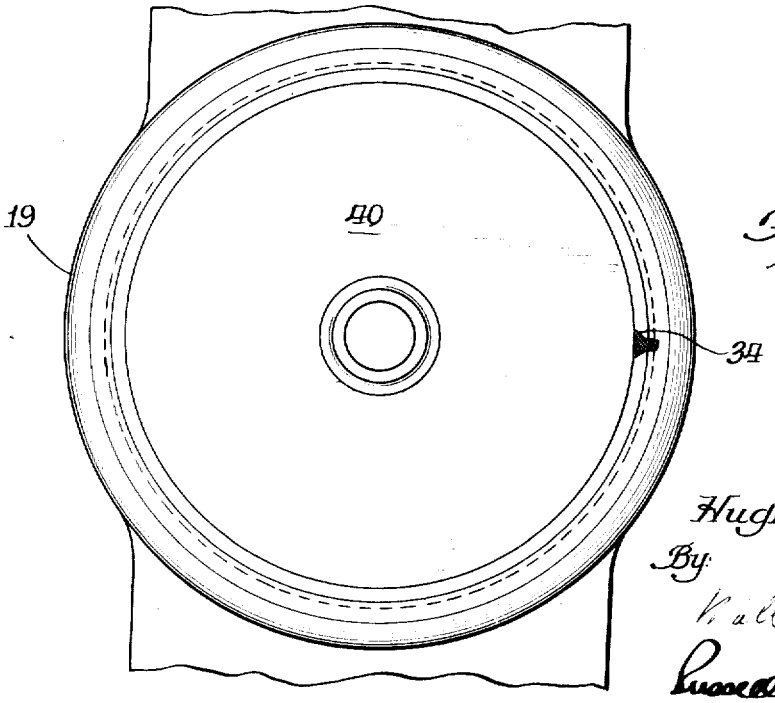
FIG. 6 is a plan view of the center plate area of the bolster, showing the wear lining after being welded in position.

As shown in FIGS. 4–6, the ring 32 is fitted within the circular recess 40 of the bolster center plate 19 around the periphery thereof and is attached to the interior vertical wall 42 of said center plate.

As shown in FIG. 5, the interior wall 42 of the center plate is machined to be inclined outward from top to bottom at about the same angle as the taper of the ring surface 38. The ring 32 is then inserted into the recess 40 and expanded to a maximum extent so as to abut the interior annular 42 around its entire circumference. As shown in FIG. 6, the ring is then welded at the gap 34 to the interior annular wall. When the vehicle is assembled, as shown in FIG. 4, the vertical surface of the female body center plate 24 fits within the ring 32 to protect the bolster center plate wall 42 from wear. Upward movement of the ring 32 is inhibited because of the wedging action between the complementary inclined surfaces 38 and 42, thereby minimizing the stresses on the weld.

Having thus described the invention, what I claim is:

1. In a railway vehicle including a car body supported upon a car truck by means of mating center plates on respective bolsters thereof, the center plate of said truck incuding a circular recess therein having an interior annular wall, and the center plate on the bolster of said body being circular and carried within said recess, the improvement comprising a circular wear ring disposed within said recess and surrounding said body center plate to prevent wear on said interior annular wall, said interior wall being inclined outward from top to bottom, said ring having a gap therein and having an outer surface tapered outward from top to bottom complementary with said interior wall, said ring being expanded at said gap to abut said interior annular wall about its circumference and being welded in expanded position to said annular wall in said gap.

*2. In a railway vehicle including a car body supported upon a car truck by means of mating center plates on respective bolsters thereof, the center plate of said truck including a circular recess therein having an interior annular wall, and the center plate on the bolster of said body being circular and carried within said recess, the improvement comprising a circular wear ring disposed within said recess and surrounding said body center plate to prevent wear on said interior annular wall, said interior wall having at least a portion thereof inclined outwardly and downwardly, said ring having a gap therein and having an outer surface with at least a portion thereof tapered*

*outwardly and downwardly and complementary when seated with said interior wall portion and engaged therewith, said ring being expanded at said gap and welded in expanded position to said annular wall in said gap.*

References Cited

The following references, cited by the Examiner, are of record in the patented file of this patent or the original patent.

UNITED STATES PATENTS

| | | | |
|---|---|---|---|
| 1,912,563 | 6/1933 | Allison | 308—137 |
| 3,218,989 | 11/1965 | Kriner et al. | 105—200 |
| 428,527 | 5/1890 | Schoen | 308—137 |
| 2,720,432 | 10/1955 | Hadfield | 308—137 |
| 3,326,611 | 6/1967 | Christian | 308—137 |

M. HENSON WOOD, Jr., Primary Examiner

H. BELTRAN, Assistant Examiner

U.S. CL. X.R.

105—189, 200; 308—137